(12) United States Patent
Brosnihan et al.

(10) Patent No.: US 7,448,252 B2
(45) Date of Patent: Nov. 11, 2008

(54) SKIDS, MODULES, AND MODULAR SYSTEM FOR MONITORING HYDROGEN-COOLED GENERATORS

(75) Inventors: Ronald F. Brosnihan, Troy, NY (US); Thomas J. Chenaille, Troy, NY (US); James T. Clark, Clifton Park, NY (US); Steven D. Kilmartin, Johnstown, NY (US); Stephen E. Kodesch, Schenectady, NY (US); Robert A. Williams, Troy, NY (US)

(73) Assignee: Environment One Corporation, Niskayuna, NY (US)

( * ) Notice: Subject to any disclaimer, the term of this patent is extended or adjusted under 35 U.S.C. 154(b) by 333 days.

(21) Appl. No.: 11/237,170

(22) Filed: Sep. 28, 2005
(Under 37 CFR 1.47)

(65) Prior Publication Data

US 2006/0156793 A1 Jul. 20, 2006

Related U.S. Application Data (63) Continuation-in-part of application No. 09/993,390, filed on Nov. 14, 2001, now Pat. No. 6,959,585.

(51) Int. Cl.
*G01N 25/00* (2006.01)
(52) U.S. Cl. ............. 73/31.03; 73/25.01; 310/56; 108/50.02; 108/50.18
(58) Field of Classification Search ........... 73/570, 73/31.03, 25.1, 29.01, 865.8; 324/703, 772; 340/53, 55, 56; 108/42, 48, 50.01, 50.02, 108/50.11, 50.18, 51.11, 901, 53.1, 53.5, 108/53.3, 56.1, 56.3, 55.1, 55.5, 57.2–57.34
See application file for complete search history.

(56) References Cited

U.S. PATENT DOCUMENTS

| | | | | |
|---|---|---|---|---|
| 1,778,834 A | 10/1930 | Penney | | 310/55 |
| 2,307,754 A | 1/1943 | Beckwith | | 310/55 |
| 2,307,755 A | 1/1943 | Beckwith | | 310/55 |
| 2,988,656 A | 6/1961 | Grobel | | 310/53 |
| 3,122,668 A | 2/1964 | Cuny | | 310/53 |
| 3,427,880 A | 2/1969 | Grobel et al. | | 436/7 |
| 3,506,138 A | 4/1970 | Travis | | 108/91 |
| 3,822,389 A | 7/1974 | Kudlacik | | 310/53 |

(Continued)

OTHER PUBLICATIONS

Brochure by Environment One Corporation,l "Generator Condition Monitor for Air-Cooled Apparatus (GCM-A)", 4 pages, 1998.
Brochure by Environment One Corporation, "Generator Gas Analyzer (GGA)", 6 pages, 1998.
Brochure by Environment One Coporation, "Generator Condition Monitor-Explosion-Proof Design (GCM-X)". 4 pages, 1998.

*Primary Examiner*—Frank M Lawrence
(74) *Attorney, Agent, or Firm*—Heslin Rothenberg Farley & Mesiti P.C.

(57) ABSTRACT

A modular system for monitoring a hydrogen-cooled generator includes a skid having a platform, a support attachable to said platform and attachable to a plurality of modules for monitoring the hydrogen-cooled generator, and at least one module for monitoring the hydrogen-cooled generator. The module may include a vibration monitoring module. The monitoring modules may allow monitoring the operation of the hydrogen-cooled generator and generating data such as an optimization factor regarding the performance of the hydrogen-cooled generator. The module may be connected via a communications link to a remote control center.

16 Claims, 6 Drawing Sheets

U.S. PATENT DOCUMENTS

| | | | |
|---|---|---|---|
| 3,894,138 A | 7/1975 | Klaar | 310/53 |
| 3,916,671 A | 11/1975 | Carson et al. | 73/23.42 |
| 3,972,225 A | 8/1976 | Fort et al. | 73/28.04 |
| 4,008,755 A | 2/1977 | Vandamme | 165/11.1 |
| 4,046,512 A | 9/1977 | Kaczmarek et al. | 23/253 |
| 4,101,277 A | 7/1978 | Hickam | 436/2 |
| 4,139,057 A | 2/1979 | Klaar | 165/104.13 |
| 4,300,066 A | 11/1981 | Butler, III | 310/53 |
| 4,440,017 A | 4/1984 | Barton et al. | 43/40.5 R |
| 4,531,070 A | 7/1985 | Kuhn | 310/56 |
| 4,698,756 A | 10/1987 | Gonzalez et al. | 702/130 |
| 4,766,557 A | 8/1988 | Twerdochlib | 702/51 |
| 4,870,393 A | 9/1989 | Snuttjer et al. | 340/611 |
| 4,945,343 A | 7/1990 | Rodriguez | 340/606 |
| 4,959,569 A | 9/1990 | Snuttjer et al. | 310/53 |
| 5,097,669 A | 3/1992 | Hargrove et al. | 62/96 |
| 5,123,277 A | 6/1992 | Gray et al. | 73/29.01 |
| 5,581,470 A | 12/1996 | Pawloski | 364/483 |
| 5,676,065 A | 10/1997 | Locker | 108/55.1 |
| 5,684,718 A * | 11/1997 | Jenkins et al. | 702/57 |
| 5,701,044 A | 12/1997 | Emshoff et al. | 310/54 |
| 5,979,338 A | 11/1999 | Salmanson et al. | 108/55.1 |
| 6,046,602 A * | 4/2000 | Stein | 324/772 |
| 6,058,852 A | 5/2000 | Estvanko | 108/55.3 |
| 6,076,568 A | 6/2000 | Rehm et al. | 141/98 |
| 6,086,333 A | 7/2000 | Krutzfeldt et al. | 417/54 |
| 6,126,726 A | 10/2000 | Foley, Jr. et al. | 96/11 |
| 6,324,858 B1 | 12/2001 | Holden | 62/211 |
| 6,326,709 B1 | 12/2001 | Adelmann et al. | 310/52 |
| 6,338,283 B1 | 1/2002 | Blazquez Navarro et al. | 73/865.8 |
| 6,424,062 B1 | 7/2002 | Adelmann et al. | 310/53 |
| 6,456,095 B1 | 9/2002 | Sorita et al. | 324/703 |
| 6,959,585 B2 | 11/2005 | Brosnihan et al. | 75/25.01 |
| 7,206,719 B2 * | 4/2007 | Lindsay et al. | 702/177 |

\* cited by examiner fig. 1 fig. 2 fig. 3 fig. 4 fig. 5 fig. 6

SKIDS, MODULES, AND MODULAR SYSTEM FOR MONITORING HYDROGEN-COOLED GENERATORS

CROSS-REFERENCE TO RELATED APPLICATION

This application is a continuation-in-part patent application of U.S. patent application Ser. No. 09/993,390 filed on Nov. 14, 2001, entitled "Skids, Modules, And Modular Systems For Monitoring Hydrogen-Cooled Generators," now issued as U.S. Pat. No. 6,959,585, the entire subject matter of which is incorporated herein by reference.

FIELD OF THE INVENTION

The present invention relates generally to hydrogen-cooled generators, and more particularly to equipment for use in monitoring hydrogen-cooled generators.

BACKGROUND OF THE INVENTION

Hydrogen-cooled generators are often used by power utilities for generating electricity. Typically, separate, independent, stand-alone systems are employed in monitoring the operation of the hydrogen-cooled generators to reduce the downtime of the hydrogen-cooled generators. For example, such systems for monitoring the operation of hydrogen-cooled generators include systems for monitoring hydrogen purity and systems for monitoring overheating of the generator. Other stand-alone systems include systems for removing contaminants from the hydrogen cooling gas. Typically, each of the stand-alone systems is separately operably connected to the hydrogen-cooled generator and separately operably connected to a control center.

There is a need for further equipment for monitoring hydrogen-cooled generators.

SUMMARY OF THE INVENTION

The present invention provides, in a first aspect, a modular system for monitoring a hydrogen-cooled generator. The modular system includes a skid having a platform, a support attachable to the platform and attachable to a plurality of modules for monitoring the hydrogen-cooled generator, and at least one module for monitoring the hydrogen-cooled generator.

The present invention provides, in a second aspect, a module connectable to a modular system for monitoring a hydrogen-cooled generator. The module includes a processor for generating data associated with performance of the hydrogen-cooled generator, and at least one of a display for displaying on the module an indication of the performance of the hydrogen-cooled generator based the data and a communications link for transferring the data to a remote location.

The present invention provides, in a third aspect, a method for use in monitoring a hydrogen-cooled generator. The method includes providing a modular system comprising a plurality of modules for monitoring a plurality of operating parameters of the hydrogen-cooled generator.

The present invention provides, in a fourth aspect, a skid for use in a modular system for monitoring a hydrogen-cooled generator. The skid includes a platform, a support attached to the platform, and means for attaching the support to a plurality of modules for monitoring the hydrogen-cooled generator.

BRIEF DESCRIPTION OF THE DRAWINGS

The subject matter which is regarded as the invention is particularly pointed out and distinctly claimed in the concluding portion of the specification. The invention, however, may be understood by reference to the following detailed description of the following embodiments and the accompanying drawings in which:

DETAILED DESCRIPTION OF THE INVENTION

Figure 1:
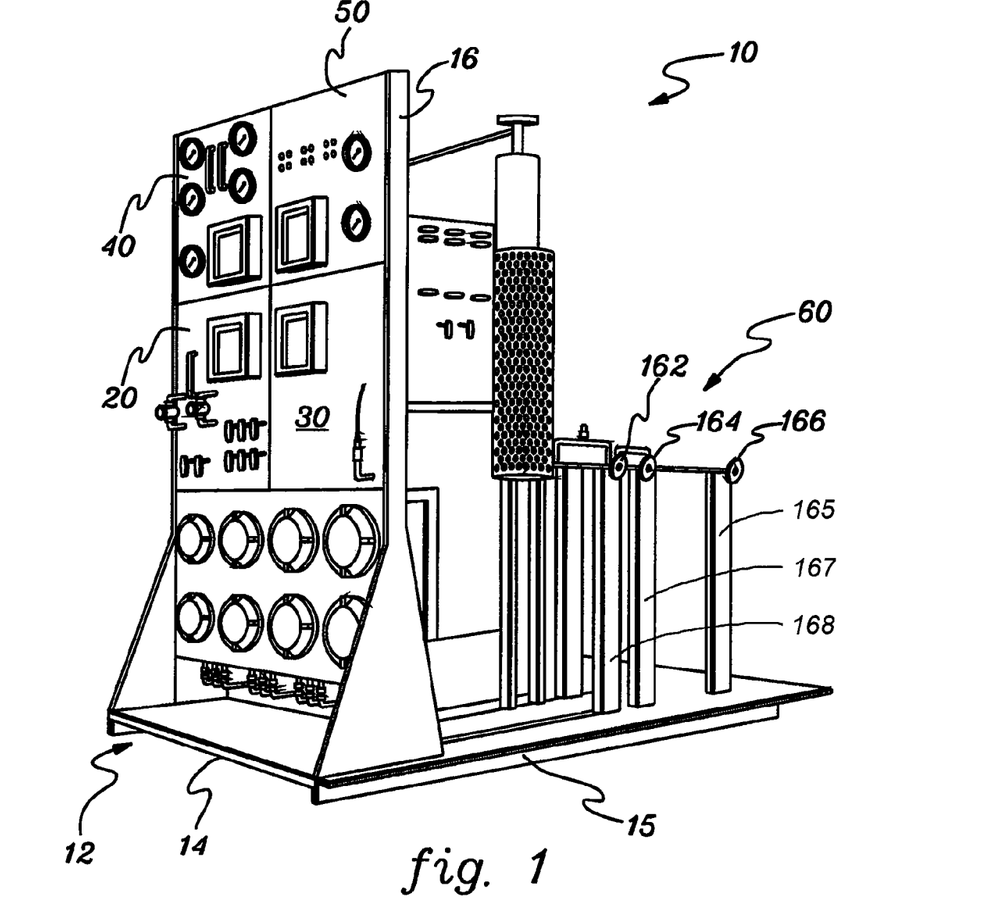
FIG. 1 is a perspective view of a modular system in accordance with the present invention.

FIG. 1 illustrates a modular system 10 in accordance with the present invention. In one aspect, modular system 10 is configured as a compact modular system. Modular system 10 may include a readily movable skid 12 having a platform 14 supported on runners 15. Skid 12 also includes an upwardly extending support 16 attached to platform 14 and attachable to a hydrogen gas purity monitoring module 20, a generator overheat monitoring module 30, a hydrogen gas dryer module 40, and a gas/generator monitoring module 50. Attached to skid 12 is also a gas manifold 60 having an air inlet 162, a hydrogen gas inlet 164, and a carbon dioxide (CO2) inlet 166.

As readily appreciated by those skilled in the art, the means for attaching the support to the various modules may include connectors bolts, bolts and nuts, or screws, other suitable connectors, and combinations thereof. For example, as shown in FIG. 1, the corners of the faceplate of the modules may be attached to the supports using a plurality of bolts, bolts and nuts, or screws. Means for attaching the gas manifold to skid may include a plurality of supports 165, 167, and 168.

Configuring the modular system as a compact modular system may also provide a customizable, cost-efficient approach to monitoring hydrogen-cooled generators. The modular system can be used with both new power plants and retrofit projects. The modular system provides information and data to generator OEMs (Original Equipment Manufacturers) and utilities which can be used to reduce the likelihood of outages and maximize performance. In addition, the engineering and installation costs for installing and connecting the modular system to a hydrogen-cooled generator may be reduced compared to installing and connecting separate stand-alone systems to the hydrogen-cooled generator.

Figure 2:
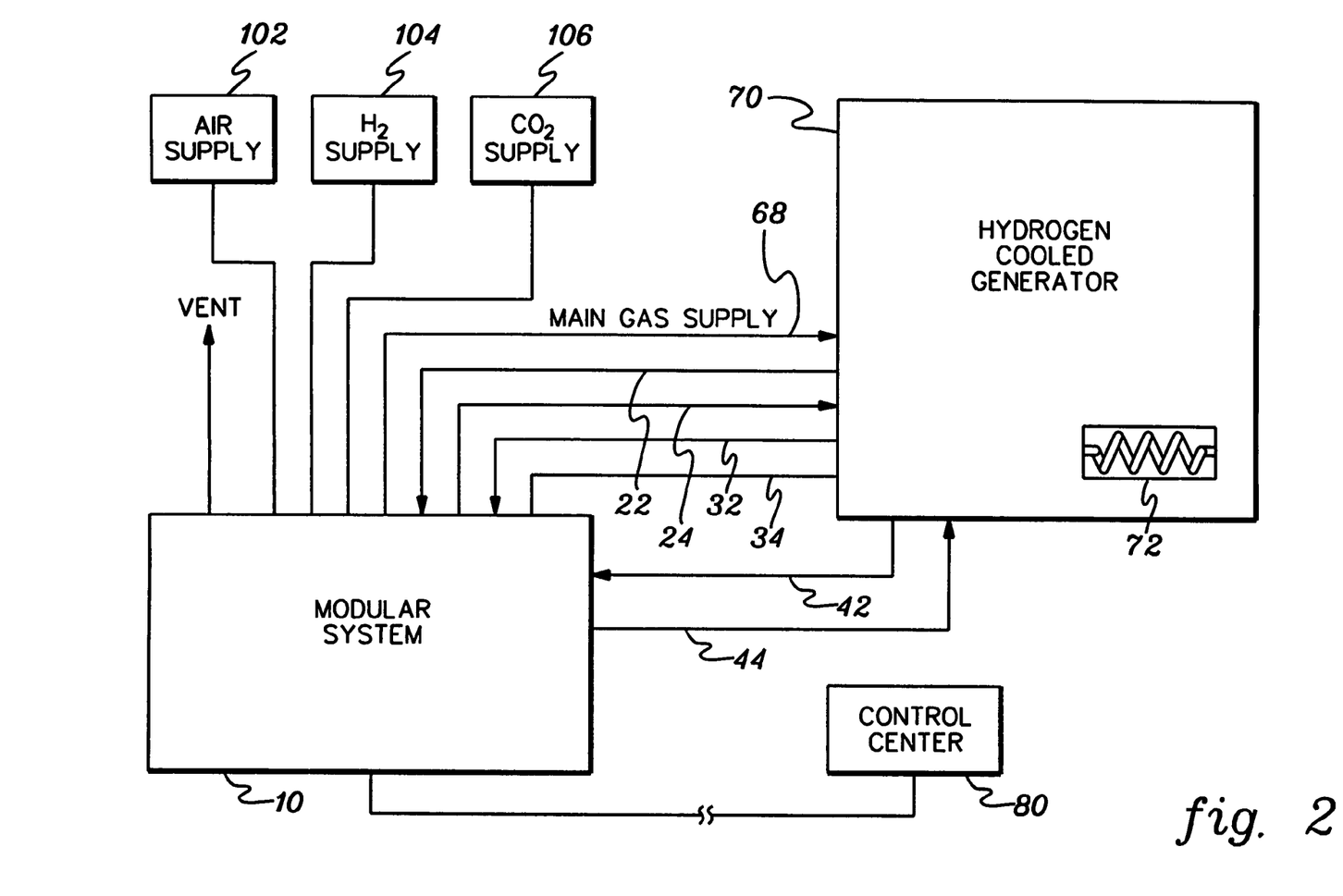
FIG. 2 is a block diagram of the modular system shown in FIG. 1 connected to a hydrogen-cooled generator, a hydrogen supply, a carbon dioxide (CO2) gas supply, an air supply, and a control center.

As shown in FIG. 2, modular system 10 may be operably connected via gas manifold 60 (FIG. 1) to an air supply 102, a hydrogen supply 104, and a CO2 supply 106, a hydrogen-cooled generator 70, and to a control center 80, for example, a computing unit at a remote location. Hydrogen-cooled generator 70 may be an electrical power plant generator which is filled with pressurized hydrogen cooling gas to cool the generator.

The hydrogen cooling gas may be supplied to modular system 10 from hydrogen supply 104, and thereafter, controllably fed by an outlet 68 of gas manifold 60 (FIG. 1) to hydrogen-cooled generator 70. For example, manually operated or automatically controlled valves may operable control the introduction of $CO_2$ to purge air in the hydrogen-cooled generator case and the introduction of hydrogen gas to the hydrogen-cooled generator case. Monitoring of the purity of the supply of hydrogen gas in the hydrogen-cooled generator case may be monitored as described below in connection with hydrogen gas purity monitoring module 20. For repairs, the $CO_2$ may be introduced to purge the hydrogen gas from the hydrogen-cooled generator case. Thereafter, air from air supply 102 may be introduced to the hydrogen-cooled generator case. Typically, during normal operation, the hydrogen cooling gas in the hydrogen-cooled generator case is passed through a heat exchanger 72 to remove heat from the hydrogen cooling gas.

Figure 3:
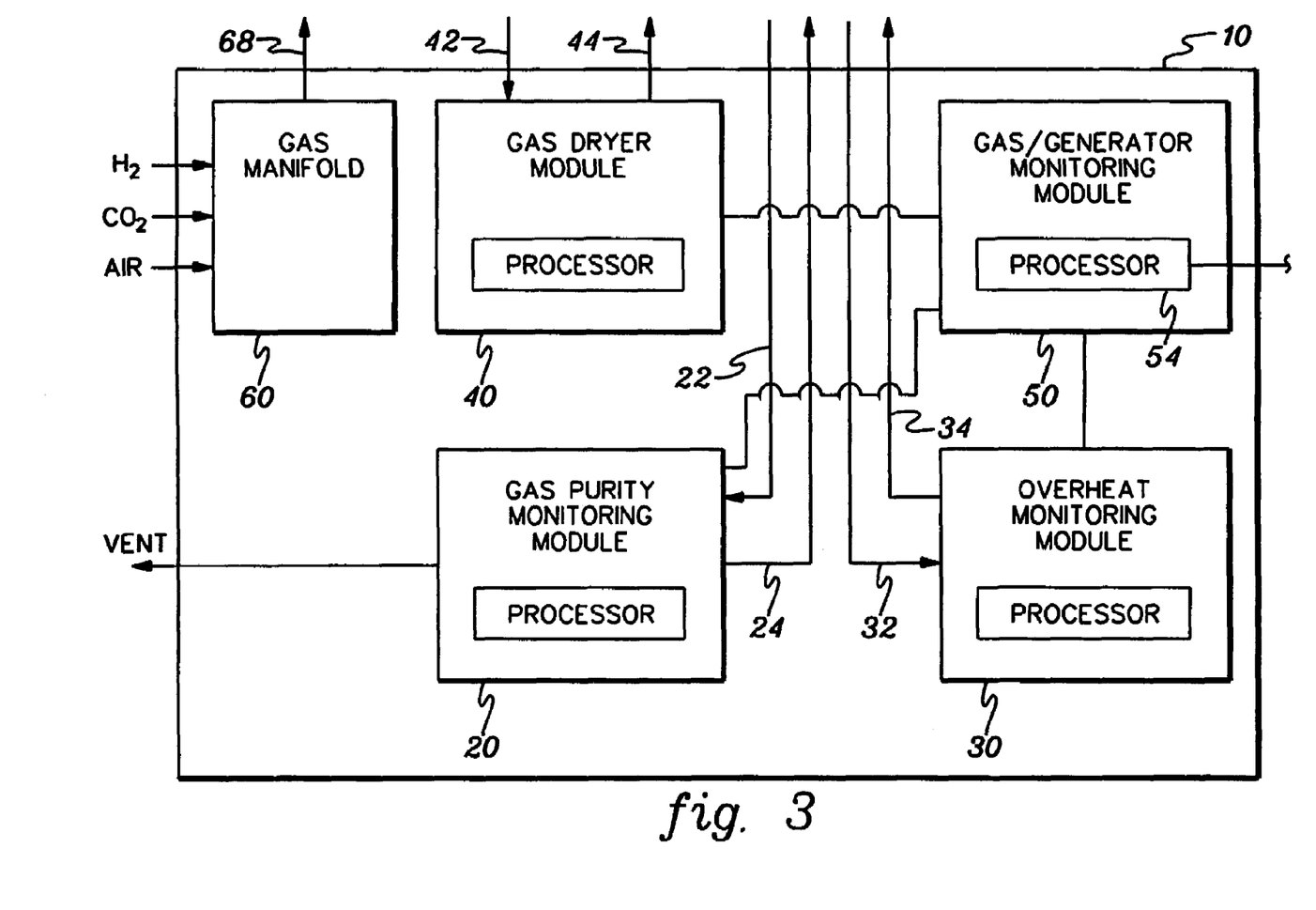
FIG. 3 is a block diagram of the modular system shown in FIG. 1.

With reference to FIGS. 2 and 3, hydrogen gas purity monitoring module 20 analyzes the purity of the hydrogen cooling gas. A portion of the hydrogen cooling gas in hydrogen-cooled generator 70 is supplied via a conduit 22 to hydrogen gas purity monitoring module 20. After testing for the purity of the hydrogen cooling gas, the hydrogen cooling gas is suitably vented or returned via a conduit 24 to the generator. Hydrogen gas purity monitoring module 20 may continuously monitor hydrogen cooling gas during normal and during purge operations to optimize purity levels and operational efficiency. For example, as hydrogen purity drops windage losses increase which results in higher operating costs per megawatt. Since hydrogen can be explosive when mixed with oxygen, maintaining the hydrogen cooling gas at a safe, non-combustible, and non-explosive level also increases safety.

Hydrogen gas purity monitoring module 20 may include suitable sensors/analyzers and controller modules within flame-proof enclosures, a display/control panel, and an optional gas flow indicator with metering valve. The controller modules may include a microcontroller or processor to control purity monitoring, calibration, mode selection, sensor unit control, alarm contacts, fault logging, system inputs/outputs, sensor unit linearization, and diagnostics. Suitable sensors include thermal conductivity sensors which allow monitoring the purity of hydrogen cooling gas during normal operation, allow monitoring the amount of hydrogen gas in $CO_2$ during the initial phase of purging, and allow monitoring the amount of $CO_2$ in air during the final stage of the purge process. Hydrogen gas purity monitoring module 20 may include a display or gages for displaying gas purity.

Early warning of generator overheating can mean the difference between a brief shut-down for minor repairs and a major overhaul involving weeks or even months of costly downtime. High concentrations of submicron particles (pyrolytic products) are produced when materials, e.g., coatings and insulation, within the generator are heated sufficiently to produce thermal decomposition. These "hotspots" can lead to catastrophic failure if not detected in a timely manner.

Generator overheat monitoring module 30 provides a sensitive real-time detector and early warning of generator hotspots. For example, pyrolytic products, when present, may be detected by a suitable sensor such as an ion chamber detector. A portion of the hydrogen cooling gas may be supplied via a conduit 32 to generator overheat monitoring module 30, and after testing for pyrolytic products, the hydrogen cooling gas may be suitably returned via a conduit 34 to the hydrogen-cooled generator.

Generator overheat monitoring module 30 may include a microcontroller or processor so that if an emergency situation occurs, the processor may initiate and monitor an alarm verification sequence upon detection of hotspots. If the alarm is confirmed, a verified alarm indication is given, alarm contacts are switched, and a fixed amount of the hydrogen cooling gas automatically passes through one or more sampling systems, e.g., by activation of a solenoid valve in a filter/solenoid valve assembly. The hydrogen cooling gas then passes through the filter, which removes the submicron particles which are collected for laboratory analysis to determine their source. Alternative sensors may include temperature sensors such as RTDs (resistance temperature detectors) or thermocouples.

A specially synthesized set of chemically and thermally stable compounds applied to critical areas of the generator may also be employed to enhance the information derived by generator overheat monitoring module 30. In the event of a verified alarm, the generator overheat monitoring module may capture a sample of the hydrogen cooling gas so that areas of overheating can be pinpointed. Generator overheat monitoring module 40 may include a display or gages for displaying gas flow and ion chamber detection output.

Hydrogen gas dryer module 40 removes contaminants from the hydrogen cooling gas during all phases of generator operation. Water, oil and other contaminants often cause corrosion in critical areas of hydrogen-cooled generators and contribute to windage losses and reducing operational efficiency and increasing the likelihood of forced outages.

For example, hydrogen gas dryer module 40 may receive a portion of the hydrogen cooling gas via a conduit 42. Hydrogen gas dryer module 40 may include a suitable dryer system which incorporates a desiccant or drying agent, a catalatic material, or a filter. In addition, hydrogen gas dryer module 40 may also incorporate continuous dew point monitoring and display of the dew point for both inlet and outlet lines to the dryer. The result is that operators can monitor the efficiency of the drying process, and allow dryer regeneration at the optimum time. Other displays or gages may include pressure, temperature, and flow rate. After the hydrogen cooling gas passes through the dryer, the dried hydrogen cooling gas is returned via a conduit 44 to the hydrogen-cooled generator.

Figure 4:
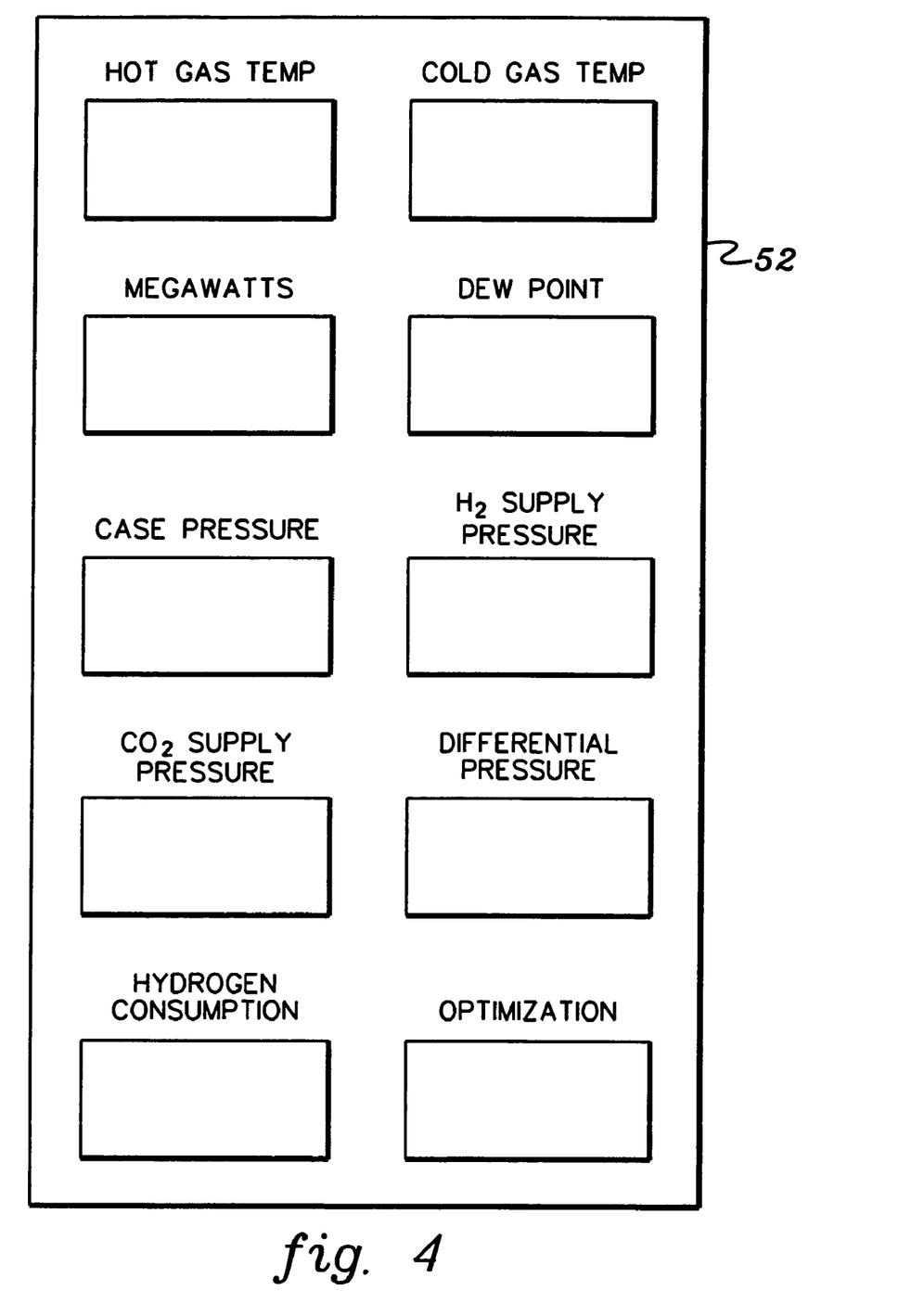
FIG. 4 is an illustration of the display of the gas/generator monitoring module of the modular system shown in FIG. 1.

Gas/generator monitoring module 50 allows monitoring of the operation of the hydrogen-cooled generator and generating of data regarding the performance of the hydrogen-cooled generator. FIG. 4 illustrates a display 52 of gas/generator monitoring module 50 for displaying a hot gas temperature, a cold gas temperature, a megawatts output, a dew point, a case pressure, a hydrogen supply pressure, $CO_2$ supply pressure, a differential pressure, a hydrogen consumption, and an optimization factor. The hot and cold gas temperatures may be obtained by thermal couples or RTDs (resistance temperature detectors) attached to an inlet and an outlet, respectively, of the cooling loop, the megawatts output may be obtained from the control center, the dew point may be obtained from the hydrogen gas dryer, the case pressure may be obtained from a pressure transducer attached to the generator, the hydrogen supply pressure may be obtained from a pressure transducer attached to the hydrogen supply line, the $CO_2$ supply pressure may be obtained from a pressure transducer attached to the $CO_2$ supply line, the differential pressure may be obtained from a differential pressure transducer for measuring pressure across a fan in the hydrogen-cooled generator, and the hydrogen consumption may be obtained from a flow meter disposed between the hydrogen supply and the hydrogen-cooled generator. From the above description, the various items of information may be obtained directly from sensors attached to the hydrogen-cooled generator or may be obtained via a communications link (described more fully hereinafter) from the control center.

In another aspect of the present invention, gas/generator monitoring module 50 enables a power utility or generator OEM to display an optimization factor or data regarding the performance of the hydrogen-cooled generator. For example, an optimization factor may be based on the hydrogen purity, the differential pressure, the case pressure, the megawatts that the generator is producing, the cold gas temperature, the hot gas temperatures, the amount of hydrogen consumed, the detection of overheating, the dew point reading, and/or other measurements.

Figure 5:
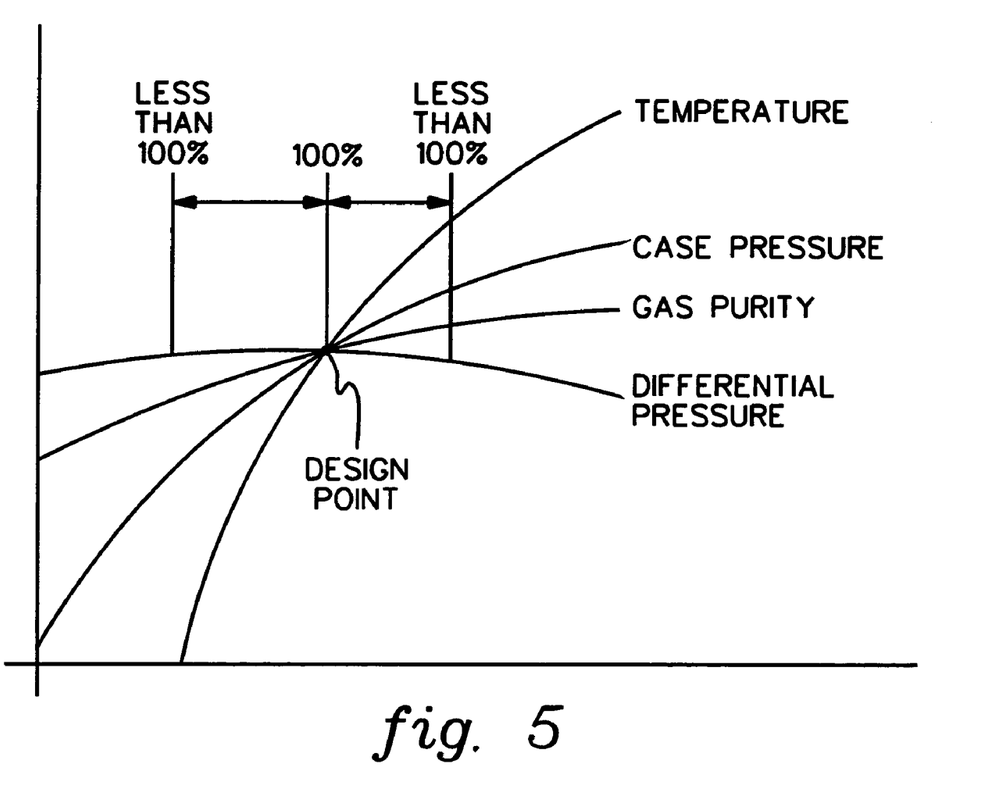
FIG. 5 is a graph illustrating various operating parameters and an optimum design operating point of a hydrogen-cooled generator.

FIG. 5 graphically illustrates the use of various operating parameters of a hydrogen-cooled generator for indicating a design point for efficient operation of the hydrogen-cooled generator. Operating the hydrogen-cooled generator at a point away from the design point results in a less efficient operation of the hydrogen-cooled generator.

Suitable programming or algorithms may be written and run on a suitable processor 54 or microcontroller of the gas/generator monitoring module for calculating an optimization factor based on various variables and weightings which may be specified by the end user or generator manufacturer. The software may also allow reprogramming or adjustment by an end user.

For example, operating away from the design point may result in less that 100-percent efficiency. The optimization factor may be displayed in real-time. For examples, values between 90-percent and 100-percent efficiency may be selected as being acceptable. Alternatively, the display may read, "acceptable" or "not acceptable", or "good", "fair", and "poor." The optimization factor can be displayed locally on the gas/generator monitoring module, and/or transferred via the communications link.

In addition to mechanically and electrically integrating the various modules together, another aspect of the present invention includes the gas/generator monitoring module having a communications link, e.g., a two-wire communication (e.g., a 4-milliamp to 20-milliamp output), an RS232 electrical interface, a modem, a wireless remote communication, a global communications network interface connectable to the Internet, or other suitable communications link, for integrating the modular system with control center 80 or to a remote computing unit. This configuration reduces the number of connections or wires typically required to communicate information from each of the various modules to a control center or a remote computing unit, and/or to receive information from the control center or the remote computing unit. In addition, the remote computing unit may allow third-party monitoring of information and data streams, and preventative maintenance analysis. Also, an operator may adjust the modular system and/or control the hydrogen-cooled generator based on the display readouts including the optimization factor, and/or the control center may use the data from the modular system for controlling the operation of the hydrogen-cooled generator.

Figure 6:
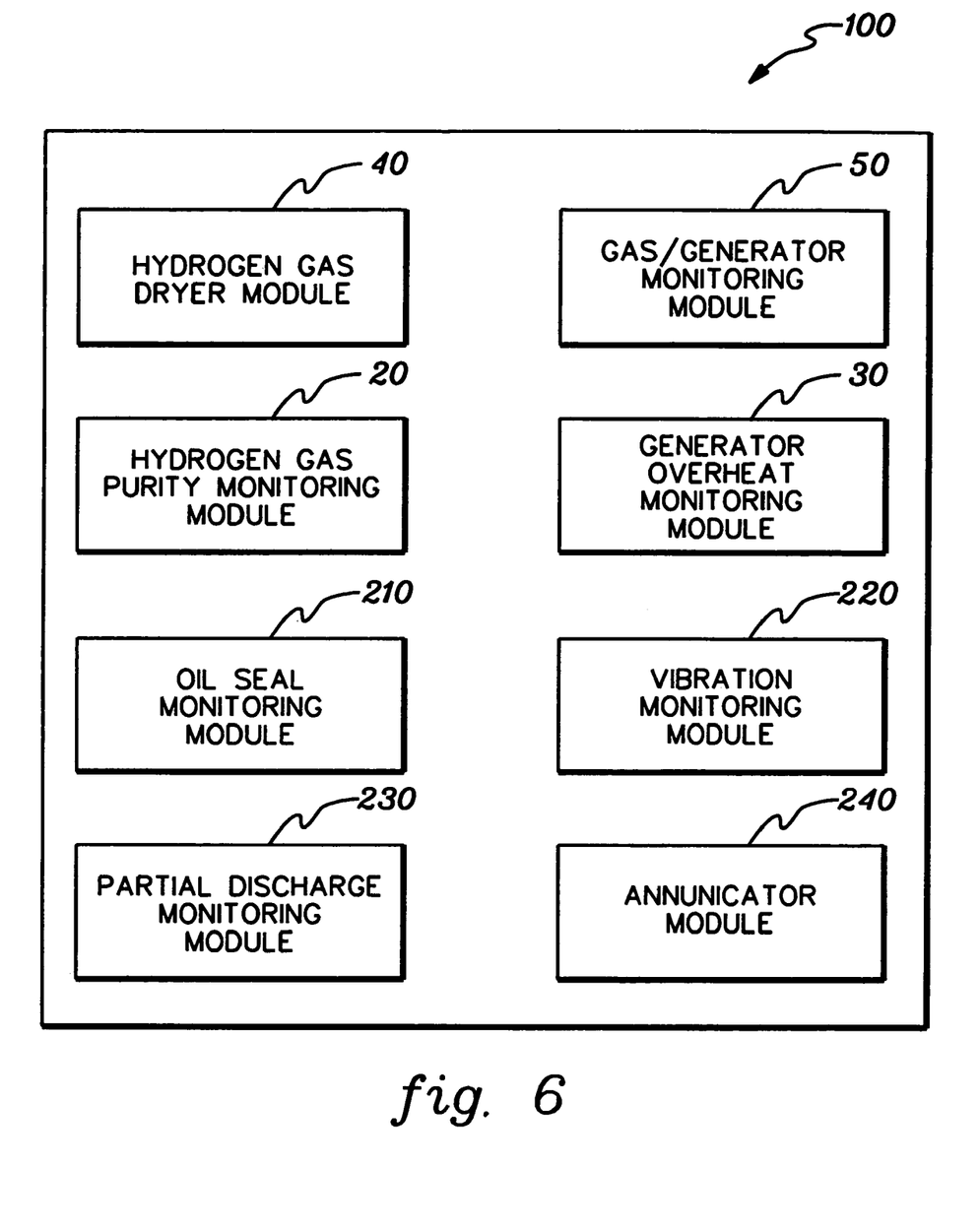
FIG. 6 is a block diagram of another embodiment of a modular system in accordance with the present invention.

FIG. 6 illustrates another embodiment of a modular system 100 in accordance with the present invention. Modular system 100 may be configured as a compact modular system and include a readily movable skid having a platform supported on runners as described above. The skid may include an upwardly extending support attached to the platform and attachable to the various modules. A gas manifold having an air inlet, a hydrogen gas inlet, and a carbon dioxide (CO2) inlet may be attached to the skid as described above.

Modular system 100 may include a hydrogen gas purity monitoring module 20, a generator overheat monitoring module 30, a hydrogen gas dryer module 40, a gas/generator monitoring module 50 as described above. Modular system 100 may also include a seal oil monitoring module 210, a vibration monitoring module 220, a partial discharge monitoring module 230, and an annunciator module 240.

In general, the gas cooling system in the hydrogen-cooled generator interacts, or interfaces, with a seal oil system. Seal oil monitoring module 210 monitors the operating parameters of the generator seal oil system. Such parameters may include the seal oil flow, the seal oil supply pressure, and the differential pressure of the seal oil. For example, the seal oil monitoring module may be operably connected to a flow meter, pressure gages, pressure switches and transmitters, and differential pressure switches and transmitters for monitoring the generator seal oil system.

The seal oil monitoring module may also be operable to monitor and control the seal oil flow regulator. For example, the seal oil flow regulator may be controlled by a dual stage regulator valve that senses seal oil supply to the generator which is compared to generator hydrogen gas pressure. Seal oil pressure needs to be maintained at a pressure higher than the hydrogen pressure (e.g., about 5 psi higher). Regulation may include increasing or decreasing the flow rate of oil, and/or increasing or decreasing the pressure of the oil. The parameters monitored by the seal oil monitoring module may be displayed on the front of the module attached to the skid, provided to a remote plant control room or local display via local device or annunciator display. Measurements of flow rate may be in gallons per minute or liters per minute, and pressure may be in psi, bar, or kg/cm2.

Vibration monitoring module 220 monitors the hydrogen-cooled generator for variations that can lead to mechanical and/or electrical failures in the hydrogen-cooled generator. For example, vibration sensors may be employed for measuring, displaying and analyzing displacement (e.g., displacement transducer such as an eddy current device particularly suitable for monitoring journal type bearings and rotors in the hydrogen-cooled generator), velocity (e.g., a velocity transducer employing a spring held magnet moving through a coil of wire), and/or acceleration (e.g., an accelerometer employing a piezoelectric device). It will be appreciated that other types of vibration sensors may be employed for monitoring vibration in the hydrogen-cooled generator.

Partial discharge monitoring module 230 monitors the hydrogen-cooled generator for imperfections and deterioration of insulating materials and components in the generator. Partial discharges are partial failures of the insulation. The partial failures create minute sparking or arcing across the surface or within the bulk of the insulation. The minute sparking produces signals in the radio frequency spectrum that may be sampled, measured and analyzed using high frequency instruments and software as is known in the art. Partial discharges generally occur at voids, cracks or other flaws where the localized electrical stresses exceed the capacity of the insulation. Once partial discharge activity occurs, insulation failure may be imminent. Partial discharge monitoring complements the generator overheat monitoring module for detection of materials within the generator when heated sufficiently to produce thermal decomposition (e.g., pyrolytic products). Partial discharge monitoring module differs from the overheat monitoring module by detecting imperfections within the insulating material, while the overheat module monitors the hydrogen flow for signs of thermal particulation (pyrolytic products or particles). Taken together, these complementing technologies offer an "inside" and "outside" form of detection regarding the status of the insulation in the hydrogen-cooled generator.

Annunciator module 240 is an intrinsically safe display and associated electronics package. The annunciator module is used to safely display various generator operating parameters in hazardous areas such as areas having combustible or flammable gaseous mixtures. With the annunciator module, the electrical signals are supplied through a shunt safety barrier making it an intrinsically safe circuit. Local display (i.e., in the hazardous area) allows plant operators to readily take action as required. External signals such as those being supplied by systems both located on the modular system, or located in another area (away from the modular system), are displayed on a panel of the annunciator module. For example, the display may be of the status of sensing devices; e.g., "pump on", "pump off", or numerical values of analog devices; e.g., "100%", "10 degrees C.", etc. Customers may choose to have these signals in the hazardous area, or may elect to have these signals simultaneously replicated in a power plant control room.

The increased information provide by the various modules of the modular systems provides an advantage to the operator by having ready access to numerous data regarding the hydrogen-cooled generator at one location. The modules or portions there of the present invention may be combined with other of the modules. For example, the vibration monitoring may be incorporated into and displayed on one of the other modules.

From the present description, it will be appreciated that any or each of the various modules may include a processor and may be provided with a communication link for connecting to a remote control unit and/or a display for displaying generated data regarding the performance of the hydrogen-cooled generator. In addition, the processor may be include, for example, a central processing unit (CPU), a memory, and one or more input/output devices, which are well known in the art. It will also be appreciated by those skilled in the art that a utility may choose the various components or modules which are to be assembled into the modular system. In addition, the modular system may include more than one of the same components or modules, and may include more or less than the four modules described above.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A modular system for monitoring a remotely located hydrogen-cooled generator, said modular system comprising:
   a skid comprising a platform;
   a support attachable to said platform and attachable to a plurality of modules for monitoring the remotely located hydrogen-cooled generator;
   at least one module for monitoring the remotely located hydrogen-cooled generator comprising a vibration monitoring module; and
   a gas manifold attached to at least one of said platform and said support and attachable to the remotely located hydrogen-cooled generator.

2. The modular system of claim 1 wherein said at least one module for monitoring the hydrogen-cooled generator comprises a plurality of modules for monitoring the hydrogen-cooled generator.

3. The modular system of claim 1 gas manifold is operable for transferring at least one of a supply of hydrogen gas, a supply of CO2 gas, and a supply of air to the hydrogen-cooled generator.

4. The modular system of claim 1 further comprising a communications link for transferring data from said at least one module to a remote location.

5. A module connectable to a modular system for monitoring a hydrogen-cooled generator, said module comprising:
   a processor operable to obtain an optimum design operating point of a hydrogen-cooled generator based on a plurality of operating parameters of the hydrogen-cooled generator;
   said processor operable to obtain a plurality of operating parameters of the operating hydrogen-cooled generator;
   said processor operable to generate an optimization factor of the operating hydrogen-cooled generator based said optimum design operating point and the plurality of operating parameters;
   a display for displaying on said module indicia based on said optimization factor; and
   wherein said module comprises a vibration module.

6. The module of claim 5 wherein the optimization factor comprises a numerical value.

7. The module of claim 5 wherein the indicia comprises a percentage.

8. The module of claim 5 wherein the indicia comprises "good", "fair", and "poor".

9. A method for use in monitoring a hydrogen-cooled generator, the method comprising:
   providing a modular system comprising a plurality of modules for monitoring operating parameters of the hydrogen-cooled generator;
   obtaining an optimum design operating point of a hydrogen-cooled generator based on the plurality of operating parameters of the hydrogen-cooled generator;
   obtaining a plurality of operating parameters of the operating hydrogen-cooled generator;
   generating an optimization factor of the operating hydrogen-cooled generator based said optimum design operating point and the plurality of operating parameters;
   displaying indicia based on the optimization factor; and
   wherein said plurality of modules comprise a vibration monitoring module.

10. The method of claim 9 wherein the optimization factor comprises a numerical value.

11. The method of claim 10 wherein the indicia comprises a percentage.

12. The method of claim 9 wherein said plurality of modules comprise at least one of a hydrogen gas purity monitoring module, a generator overheat monitoring module, a hydrogen gas dryer module, and a gas/generator monitoring module.

13. The method of claim 9 further comprising transferring information associated with the monitoring of the hydrogen-cooled generator to a remote location.

14. The module of claim 5 wherein the plurality of operating parameters comprises at least some of a hydrogen purity, a differential pressure, a case pressure, an amount of megawatts that the hydrogen-cooled generator is producing, a cold gas temperature, a hot gas temperatures, an amount of hydrogen consumed, a detection of overheating, and a dew point reading.

15. The method of claim 9 wherein the indicia comprises "good", "fair", and "poor".

16. The method of claim 9 wherein the plurality of operating parameters comprises at least some of a hydrogen purity, a differential pressure, a case pressure, an amount of megawatts that the hydrogen-cooled generator is producing, a cold gas temperature, a hot gas temperatures, an amount of hydrogen consumed, a detection of overheating, and a dew point reading.

* * * * *